Sept. 5, 1967 P. STAMBERGER 3,339,218
SELF-INFLATABLE HOLLOW BODIES FOR USE AS
FLOATS AND FOR LIKE PURPOSES
Filed May 5, 1965 3 Sheets-Sheet 1
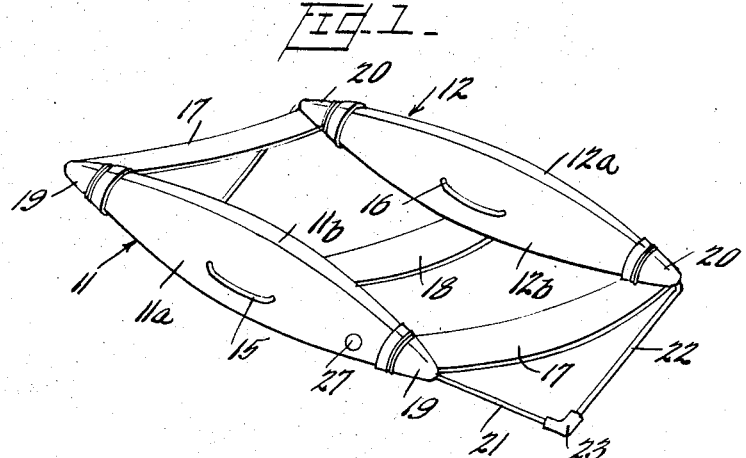
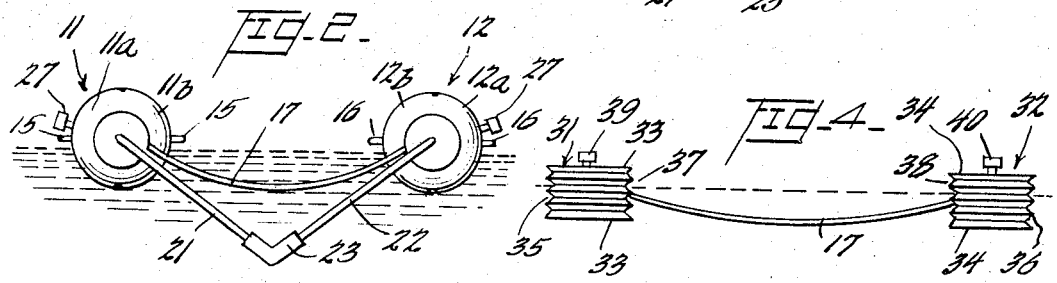
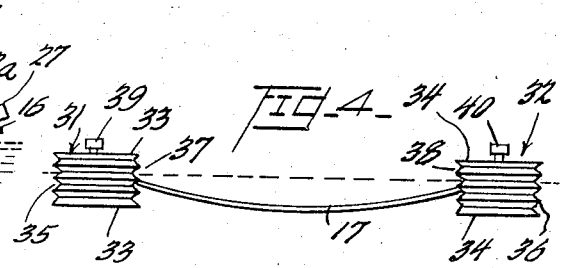
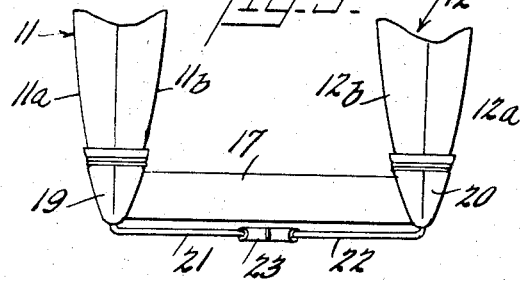
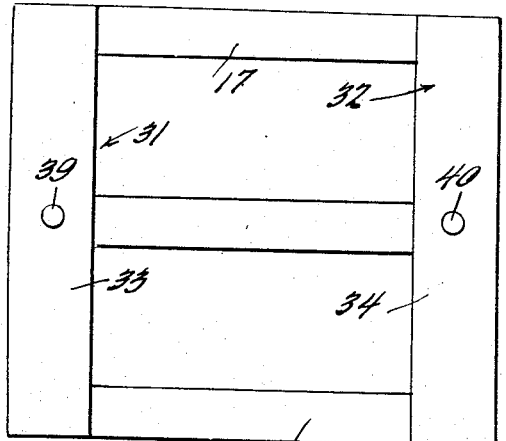
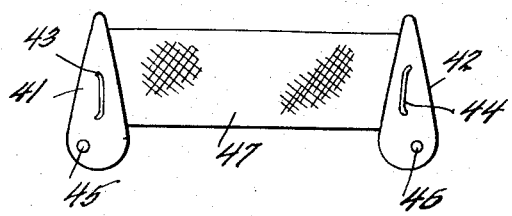
INVENTOR
Paul Stamberger,
BY Samuel Stearman
ATTORNEY

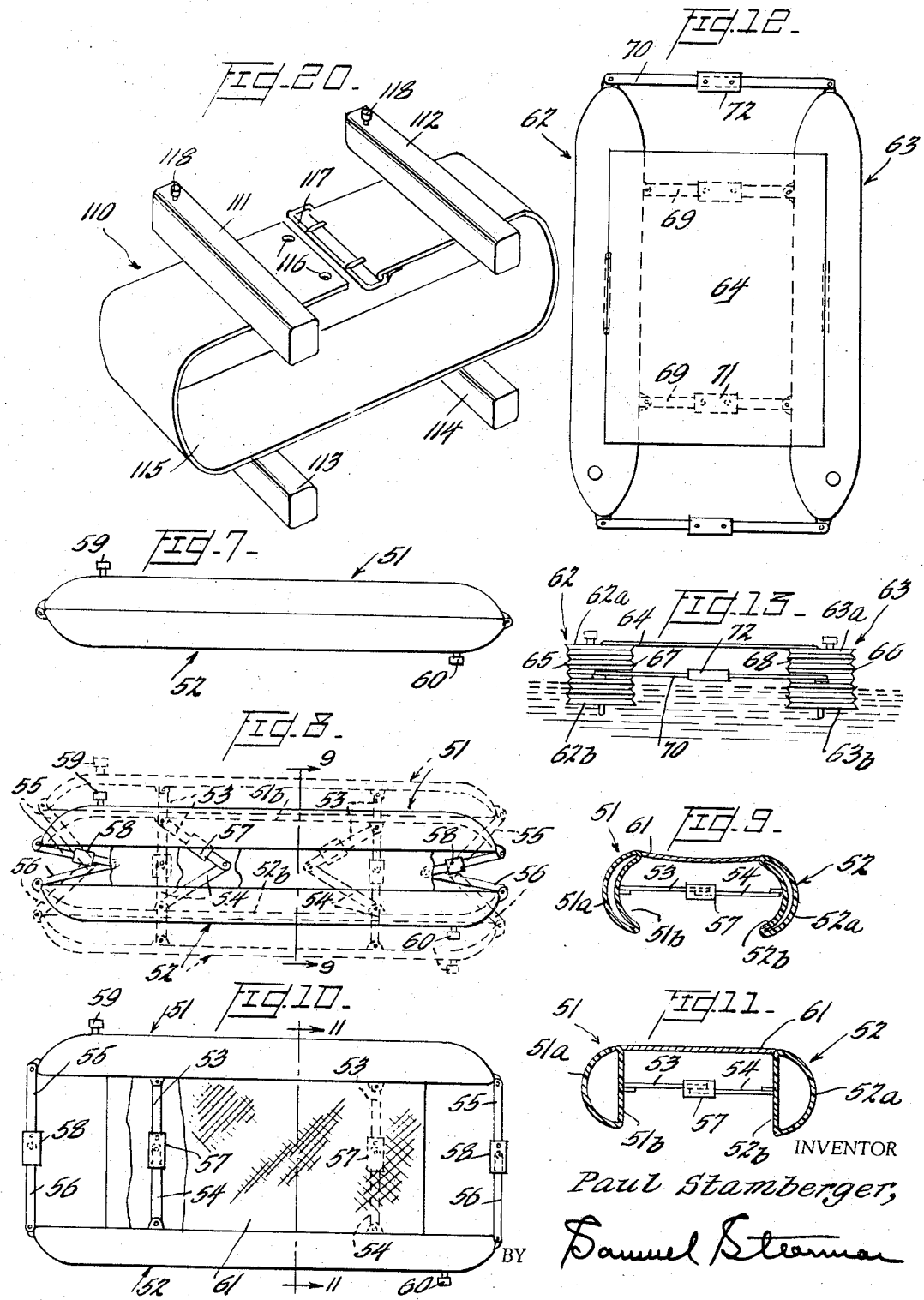

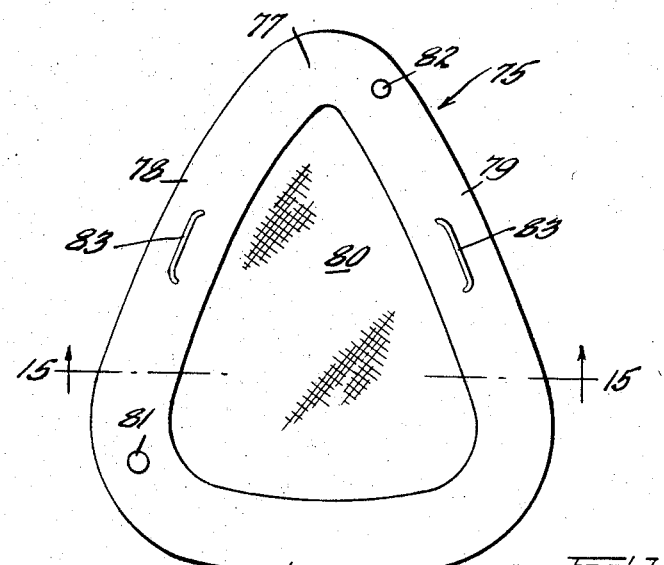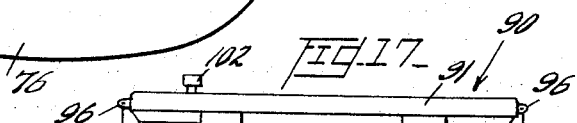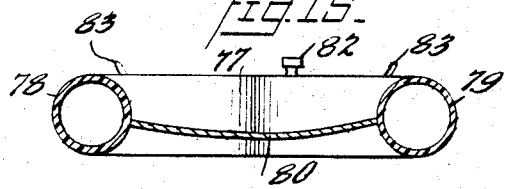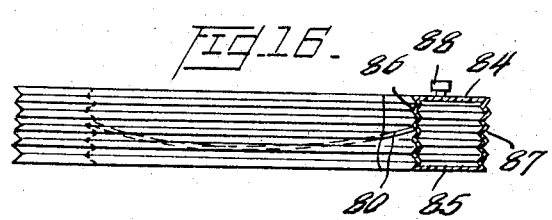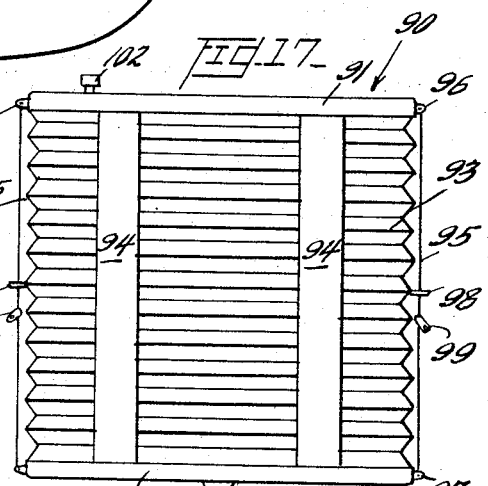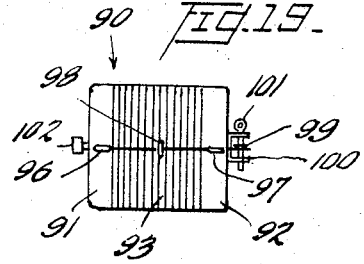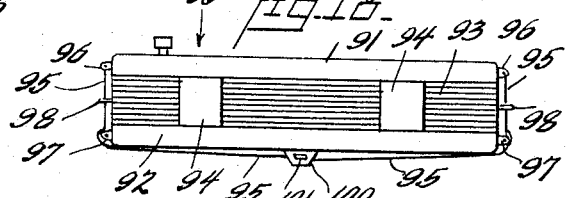

United States Patent Office 3,339,218
Patented Sept. 5, 1967

3,339,218
SELF-INFLATABLE HOLLOW BODIES FOR USE AS FLOATS AND FOR LIKE PURPOSES
Paul Stamberger, 552 University Parkway,
Baltimore, Md. 21210
Filed May 5, 1965, Ser. No. 453,328
4 Claims. (Cl. 9—11)

This invention relates to self-inflatable hollow bodies, and more particularly to self-inflatable bodies constructed in a manner to form when inflated, pneumatic articles capable of supporting substantial weights in or on the surface of water, and thus suitable for use as floats, swimming aids, life-saving devices and the like.

The present application is a companion of my copending application, Ser. No. 453,252, filed on even date herewith, and utilizes the concept underlying the construction of the self-inflatable hollow bodies therein described and claimed.

The principal object of the present invention, accordingly, is to provide hollow, self-inflatable bodies which become filled with air when converted from a collapsed configuration to an expanded configuration. The expanded and air-filled bodies, according to the present invention, are characterized particlarly by their considerable displacement of water and their true buoyancy, enabling them to be utilized for supporting the weight of a swimmer, or for floats, boating, life-saving devices and like purposes.

Another object of the invention is to provide hollow bodies of the aforesaid character suitable for the uses mentioned, and which may be so arranged in the collapsed configuration thereof as to enable them to be carried or stored easily.

Another object of the invention is to provide hollow bodies of the character above briefly set forth, which may be quickly expanded and simultaneously self-inflated to the configuration for effective use as aforementioned.

To the foregoing end, and briefly stated, the hollow bodies utilized in accordance with the invention are provided with suitably located openings for the admission of air to the interior thereof for inflating them when expanded to the maximum optimum volume which will retain the same, after the aforementioned opening is closed, in a substantially rigid state not readily deformable in water or even by the wave action of water.

Still another object of the invention is to provide floats, swimming aids, life-saving devices and the like, of the character above set forth and further characterized by their simplicity of construction and ease of operation when utilized for these purposes, particularly the ease with which they may be manually conditioned for such use and converted back from that condition to one which enables them to be conveniently transported or stored when not in use.

Still other objects and advantages of the invention will be readily apparent from the detailed description below and from the accompanying drawing in which:

FIG. 1 is a view, in perspective, illustrating one form of float or swimming aid embodying the invention;

FIG. 2 is a view thereof in end elevation, illustrating its approximate position in relation to the surface of the water when the device is placed therein for use;

FIG. 3 is a fragmentary view, in plan, of the device shown in FIG. 1;

FIG. 4 is a view in end elevation, showing a float or swimming aid of a construction similar to that of FIGS. 1–3, but utilizing hollow bodies of a modified form in which the invention may be embodied;

FIG. 5 is a top plan view thereof;

FIG. 6 is a plan view illustrating still another form of swimming aid embodying the invention;

FIG. 7 is a top plan view illustrating another form of float constructed in accordance with the invention, and showing the same as it appears in fully collapsed and closed position;

FIG. 8 is a similar view of the float of FIG. 7, showing the same as it appears in two successive, partially extended, positions of the parts;

FIG. 9 is a view in cross-section, taken along line 9—9 of FIG. 8;

FIG. 10 is a top plan view of the float of FIG. 7 showing the same as it appears in the fully extended position of the parts;

FIG. 11 is a view in cross-section taken along line 11—11 of FIG. 10;

FIG. 12 is a top plan view showing a float of a construction similar to that of FIGS. 7–11, but utilizing hollow bodies of a modified form in which the invention may be embodied;

FIG. 13 is a view, similar to FIG. 2, of the float shown in FIG. 12;

FIG. 14 is a view, in plan, illustrating a small boat embodying the invention;

FIG. 15 is a view thereof in cross-section, taken along line 15—15 of FIG. 14;

FIG. 16 is a view, in elevation, of a modified form of the swimming aid shown in FIGS. 14–15, in the expanded, inflated configuration thereof;

FIG. 17 is a view in elevation, illustrating hollow bodies of the forms shown in FIGS. 4, 5; 12, 13; and 16, in the expanded and inflated configuration thereof, and provided with means for retaining them in the deflated and collapsed configuration, and with means for preventing their distortion when in the expanded and inflated configuration;

FIG. 18 is a view similar to FIG. 17, but showing the position of the parts as they appear in the deflated and collapsed configuration of the hollow body;

FIG. 19 is a view, in side elevation, of the device shown in FIG. 18; and

FIG. 20 is a perspective view illustrating still another embodiment of the invention.

In carrying out the invention, the floats, swimming aids, life-saving devices and the like are constructed from one or more self-inflatable hollow bodies which may readily be altered from the configuration they possess in a collapsed condition, to an expanded configuration, by means of which they become air-filled to provide the required displacement of water and a buoyancy enabling the device to support its own weight together with the weight of its occupant or occupants.

The hollow body or bodies utilized as or constituting parts of the device are formed from material and in a manner such that they may readily be altered from the configuration they possess in their collapsed condition, to an expanded configuration suitable for use as aforesaid, whereby in the act of altering the configuration from that of the collapsed to that of the expanded forms thereof, they will automatically suck air into the interior thereof, in a quantity sufficient for such intended use, so long as the air thus inflating the body is held or secured therein. The air may be sucked into the hollow body through an opening or openings suitably disposed along and extending through the wall of the body.

It is in the foregoing sense, viz., the automatic sucking of air into the hollow body in the act of altering its configuration from that which it possesses when collapsed to that which it possesses when expanded, in which I herein refer to the bodies as "being self-inflatable." The air thus sucked into the interior of the body for inflating the same, may be retained therein by a suitable closure or valve for the opening. Upon removal of the closure or upon appropriate change of position of the valve, the body may readily be deflated and collapsed.

The hollow bodies hereof are preferably formed from material having a stiffness related to its elasticity as herebelow set forth. These properties are related to one another so that in the expanded, air-filled form of the body, it may be subjected to fairly heavy compressive force and yet retain its expanded configuration. At the same time, the stiffness and elasticity are such that the hollow, expanded body may readily be collapsed manually when the air is released from the hollow interior thereof. The foregoing properties of the material and the cross-sectional thickness of the walls of the body will determine the functional characteristics thereof for the intended use of the device.

In certain embodiments of the invention, as hereinafter described in more detail, the elasticity and configuration of certain parts of the walls of the body are such as to enable or cause these walls to exhibit a spring-like action, thereby enabling the body to be automatically expandable from its collapsed form, without manual effort, and simultaneously thereby become automatically inflated for its intended use.

Typical of materials which may be utilized in the practise of the invention are those made from thermo-plastic resins such as polyethylene, polypropylene, vinyl chloride, preferably plasticized, high styrene-butadiene copolymers, and the like. The material may, if necessary or desirable, be reinforced with fabric, and may also, if desired, be suitably colored or otherwise decorated.

The physical properties of the material forming the walls and surfaces of the hollow bodies hereof, in respect of their stiffness and flexibility, may be and preferably are similar to those of sheets of low density polyethylene, styrene-butadiene of 70:30 styrene:butadiene, and the like, having an average stiffness of 17,000 to 20,000 p.s.i., such as have been employed in recent years as containers for liquid materials.

Because of the difference in behavior of the great variety of suitable synthetic polymeric material under flexing and recovery, especially by varying the wall thickness, the stiffness in flexure can vary within much wider limits, for example, from 10,000 to 70,000 p.s.i., especially for the walls 35–36 shown in FIG. 4, or 65–66 in FIG. 13.

As representative of sheet material suitable for use in the practise of the invention is a plastic sheet of stiffness as shown in the tabulation herebelow, where the stiffness E, in p.s.i. is the result of stiffness tests conducted in accordance with ASTM D747–63, except that the minimum thickness requirement (0.02 in.) specified was waived.

|  | Specimen Number | | | | |
| --- | --- | --- | --- | --- | --- |
|  | 1 | 2 | 3 | 4 | 5 |
| Thickness (in.) | 0.0141 | 0.0164 | 0.0168 | 0.0174 | 0.0178 |
| Load Scale Reading (corrected) | 25.0 | 42.3 | 45.0 | 49.3 | 52.3 |
| E, p.s.i. | 17,050 | 18,320 | 18,140 | 17,880 | 17,700 |
| Average Stiffness, p.s.i. | 17,820 | 17,820 | 17,820 | 17,820 | 17,820 |

The hollow, self-inflatable bodies of the invention are preferably formed as single-piece bodies, viz., with the portions constituting the walls thereof each integral with one another. These bodies may be formed by any of the well-known molding process, such as the "blow-molding" process widely used in the production of hollow articles in the glass and plastic industries.

Referring more in detail to the drawings, FIG. 1 illustrates an embodiment of the invention constructed for use as a float or swimming aid.

The device shown in FIG. 1 is composed of a pair of hollow bodies 11, 12, interconnected with one another as hereinafter more fully described, and being each self-inflatable in the manner above described, so that in the inflated condition of the bodies they are able to provide the desired or required displacement of water and buoyancy for supporting the weight of the device and of its occupant or occupants, in or on the surface of the water.

Each of the bodies 11, 12 is preferably formed with a pair of longitudinally extending joint lines 13, 14 disposed diametrically opposite one another. These diametrically opposite joint lines or junctures demark each of the bodies 11, 12, into halves 11a, 11b and 12a, 12b, respectively. The junctures 13, 14 serve to facilitate manually collapsing and deflating each of them to a configuration in which the half-portions 11a and 12a are inserted or nested into the other half-portions 11b, 12b, respectively. To that end, the junctures 13, 14 may comprise slight indentations formed longitudinally of each body along the plane of the longitudinal axis of the respective bodies 11, 12. Preferably, the junctures are disposed on the top and bottom of each of these bodies, when viewed in the position shown in FIG. 1. These junctures provide a hinge-like action between respective halves 11a, 11b and 12a, 12b of the bodies 11, 12, to facilitate the movement of the halves 11a, 12a with respect to the opposite halves 11b, 12b, respectively, when it is desired to expand and thereby automatically inflate each body, as well as to facilitate such movement in the opposite direction when it is desired to collapse and deflate each body.

In lieu of the indented form of junctures 13, 14 shown in FIG. 1, a similar read-hinging effect may be provided by forming the corresponding diametrically opposed portions of each body in a smaller cross-sectional wall thickness than that of the remaining portions thereof.

The thickness of the walls 11, 12 may vary from say, about ¼ to 3 millimeters, being preferably between ½ and 2 millimeters.

In order to facilitate manual alteration of the configuration of each of the bodies 11, 12 from the collapsed form to the expanded form thereof, and thereby enable the hollow interior of the bodies to become automatically inflated with air, suitable handle means, such as the curved handle 15 shown on body 11 in FIG. 1, are provided along the outer surface of the half-portion 11a of body 11, and of the half-portion 12a of body 12, approximately midway along the length thereof.

As shown in FIG. 1, the hollow bodies 11, 12 are connected to one another by a strap 17 made of flexible material such as textile fabric, sheet plastic, rubber, or the like, at each of the respective ends of the body, and preferably also by an intermediate strap 18, made of flexible material such as that used for straps 17. These straps serve as supports for the body of the user of the device. The straps may have slight indented spaced grooves or the like formed in their upper surfaces, to prevent slippage thereof along the body of the user.

The end straps 17 are desirably detachable from the bodies 11, 12 and for that purpose, these straps 17 may be fixed at the respective ends thereof to cone-shaped caps 19, 20 preferably formed of relatively rigid plastic or the like, and dimensioned so as to be frictionally engageable with the correspondingly shaped ends of the bodies 11, 12.

In order to retain the bodies 11 and 12 spaced from one another at a convenient and suitable distance during the use of the device as a float or swimming aid, each of the end caps 19, 20 of each pair thereof has a rigid rod or arm 21, 22, respectively, pivoted to its apex, the rods or arms 21, 22 having their respective opposite ends thereof fitted into an opening at one of the ends of a tubular member 23 having legs extending at an angle relative to one another such as to secure the desired spacing of the bodies 11, 12 from one another.

FIGS. 4 and 5 illustrate a form of float or swimming aid which is, generally speaking, of the same construction in respect of the interconnection between the hollow bodies shown in FIGS. 1–3. However, in this embodiment, the elongated hollow bodies 31, 32 are each of substantially rectangular contour in transverse cross-section, the top and bottom walls 33, 34 thereof being substantially flat or of slightly curved configuration, while the side and end walls 35, 37 and 36, 38 are formed in a bellows-like configuration. The material of which these bellows-configured walls are formed may be of somewhat greater elasticity than that of the top and bottom walls 33, 34, thereby to render easier the manual expansion of the bodies from their collapsed configuration, to thereby cause the bodies to suck air into the interior thereof through a suitably positioned opening formed in its top wall, and likewise to render easier the manual collapsing of the bodies and deflation thereof after the closure or valve 39 for said opening has been removed.

FIG. 6 illustrates, on a reduced scale, another embodiment of the invention, suitable for use as a swimming aid. In this embodiment of the invention, the hollow, self-inflatable bodies 41, 42, are each of tapered or frusto-conical shape in the longitudinal dimension thereof. As in the case of the embodiment shown in FIGS. 1–3, suitable handle means, such as shown at 43, 44 may be formed at the top and bottom of each of the bodies 41, 42, midway along the length of the outer surface thereof, for converting the configuration of the hollow bodies from that which they possess when collapsed and deflated, to their expanded configuration whereby they will become inflated by the consequent sucking of air into the interior thereof. For that purpose, a closure or valved opening 45, 46, as in the case of the previously described embodiments, may be provided in each of the bodies 41, 42. Upon removal of the closure or release of the valve, the bodies 41, 42 may readily be restored manually to their collapsed configuration and thereby deflated.

A flexible strap 47 may be fixed, in any suitable manner, at each of its opposite ends, to the bodies 41, 42, for supporting the swimmer. The strap 47 may be formed of material similar to that described with reference to straps 17, 18 of the embodiments previously described above.

The embodiment shown in FIG. 6 thus is of a construction which renders it particularly suitable for use as a swimming aid in which the swimmer may lie on the strap 47, with his body extending in a direction transversely of the strap, so that the opposite end margins of the strap may extend around the opposite sides of the user's body and be disposed along the surface of the user's body opposite the one on which he is supported by the strap.

FIGS. 7 to 11, illustrate another embodiment of the invention suitable for use as a float, swimming aid, life-saving device, or the like.

In this embodiment, the device comprises a pair of elongated hollow bodies, indicated generally by the reference numerals 51, 52, each of which is of semi-cylindrical configuration, as best shown in FIG. 11 when expanded and inflated. In the collapsed and deflated state, each of the bodies 51, 52 is of a configuration somewhat resembling a "half-moon," in that the inner walls 51b, 52b are disposed adjacent and within the contour of the respective outer walls 51a, 52a.

In the fully collapsed, deflated condition of the bodies 51, 52, they are disposed with their corresponding longitudinal margins in substantial alignment with one another, as shown in FIG. 7, so that the thus closed device is of cylindrical cross-section.

Admission of air into and expulsion thereof from the hollow bodies 51, 52, may be provided through an opening extending through one of the walls thereof, these openings being closeable by removeable closures or by suitable valves indicated at 59, 60, respectively.

An elongated flexible strip 61, made of textile fabric, plastic or rubber material is connected at each of the longitudinal edges to each of the hollow bodies 51, 52, preferably adjacent one of the corresponding pairs of longitudinal margins of the latter. As will be understood, when the device is to be used for the above-mentioned purposes, it will be positioned in the water with the strip 61 disposed at the upper end thereof.

The hollow bodies 51, 52, may be maintained in fixed, spaced relation to one another when the device is open for use, by means of links 55 pivoted to each end of the body 51, and similarly spaced links 56 pivoted to the respective links 55 and to each end of the body 52.

For effecting movement of walls 51b, 52b with respect to walls 51a, 52a, spaced links 53 are pivoted to the wall 51b and similarly spaced links 54 are pivoted to the respective links 53 and to the wall 52b, intermediate the links 55, 56.

The closed device shown in FIG. 7 may be readied for use by manually moving the bodies 51, 52 in a direction away from one another until they occupy the positions relative to one another as shown in FIGS. 10 and 11.

FIG. 8 shows in full lines, the relative positions of the parts at an early stage of their movement from the FIG. 7 to the FIG. 10 positions. As will be noted, in that position, each pair of links 55, 56 has moved from the fully folded position it occupies within the space between the opposed facing walls 51b, 52b of the bodies 51, 52 in the closed position of the device, to a partially extended or infolded position. The same is true of each pair of links 53, 54, these having moved to that position simultaneously with the movement of the links 55, 56.

As the bodies 51, 52 are drawn farther apart from one another and reach the relative positions shown in dotted lines in FIG. 8, each pair of links 55, 56 is still in a partially, but more, infolded position. However, each pair of links 53, 54 is then in its fully extended position. Desirably, they are retained in that position by means of a sleeve or the like 57 slidable along the links and held in fixed position over the pivot between links 53 and 54, as by a set-screw. As will be seen from FIG. 9, in that position of the pairs of links 53, 54, the walls 51b and 52b are still substantially in collapsed position adjacent the walls 51a, 52a of the hollow bodies 51, 52.

When, however, the bodies 51, 52 are then drawn still farther apart from one another and reach the relative position shown in FIG. 10, each pair of links 55, 56 becomes fully extended, while the previously fully extended pairs of links 53, 54, being held rigid by the sleeves 57, exert a pulling force on the respective walls 51b, 52b so as to alter the positions of the latter from that shown in FIG. 9 to that shown in FIG. 11.

Desirably, each pair of links 55, 56 may then also be locked in their fully extended positions, as by a sleeve 58 similar to sleeve 57. With the valves 59, 60 being open before the start of the aforementioned pulling force upon walls 51b, 52b, the resultant movement of the walls 51b, 52b relative to the respective walls 51a, 52a, will cause air to be automatically sucked into the interior of the thus expanded bodies 51, 52. By then properly positioning the valves or closures 59 and 60, the inflated bodies are enabled to support the weight of the device, and of its occupants, in or on the surface of the water.

As will be evident, the collapsing and deflation of the bodies 51, 52, and return of the parts to the closed form of the device shown in FIG. 7 is accomplished by moving the parts in the reverse manner. In the closed position of the device, wherein each of the bodies 51, 52 is of a semi-cylindrical configuration, and in contact with the other along their corresponding longitudinal margins, the resultant cylinder accommodates therewith the folded links above-described, as well as the flexed strip 61.

FIGS. 12 and 13 illustrate an embodiment of the invention in which the inflatable hollow bodies 62, 63 are a substantially rectangular contour in cross-section, and with their side and end walls of bellows-like configuration, as described with reference to the embodiment shown in FIGS. 4–5. The bodies 61, 62 may be interconnected with one another by spaced pairs of pivoted links 69, 70, held in their fully extended positions by sleeves 71, 72, respectively.

FIGS. 14 and 15 illustrate an embodiment of the invention suitable for use as a small boat for occupancy by one or several persons depending primarily upon its dimensions. As will be seen, this embodiment comprises a single inflatable body, indicated generally by reference numeral 75, of continuous or closed contour, and a supporting surface or deck 80 of flexible material, such as rubber, plastic or textile fabric, secured along its periphery to the inner peripheral margin of the body 75. In the specific illustration of this embodiment of the invention, its contour is of a generally triangular form, and its cross-sectional shape is circular. As shown, valved openings such as indicated by reference numerals 81 and 82 are provided in the wall of the body member, for admission of air into and expulsion of the same from the hollow interior of the body. Suitable handle means, as indicated by reference numeral 83 are attached to or formed with the body, preferably along the legs 78 and 79 of its triangular contour, these handles serving to facilitate collapsing the inflated body after removal of the closures or proper positioning of the valves for the openings, by exerting manual pressure on the walls; and, likewise, to facilitate expansion of the hollow body, with resultant inflation thereof to the desired extent.

FIG. 16 illustrates, partly in elevation, and partly in cross-section, a modification of the embodiment shown in FIGS. 14–15. This modification differs from the latter embodiment in that the hollow body is of somewhat cross-sectional configuration, having its top and bottom walls 84, 85 substantially flat, and its sidewalls 86, 87 of bellows-like configuration, like those described with reference to FIGS. 4–5 and 12–13.

FIGS. 17, 18 and 19 illustrate a modified form of hollow body which may be utilized as the self-inflatable bodies of the embodiments shown in FIGS. 4–5; 12–13 and 16. The modification shown in FIGS. 17 to 19, is constructed so that the load-receiving surfaces of the hollow bodies are of bellows-like configuration, and such that they are not only self-inflatable but also self-expandable.

To that end, the hollow body, indicated generally by reference numeral 90, has its load-receiving walls 93 formed in a bellows-like configuration, and of such relatively high elasticity that these walls act much like springs, at least to the extent that they are normally constrained to assume the expanded confiuration shown in FIG. 17. When the body 90 is, on the other hand, deflated and the walls 93 are forcefully moved toward one another, the bellows-configured walls may be compressed to the configuration illustrated in FIG. 18. In that position the walls 93 may be held under restraint and prevented from unintentionally returning the body to its expanded configuration shown in FIG. 17. To the latter end, a cord 95 may be provided, this cord is passed through eyes formed in brackets 96, 97 fixed along the top and bottom walls 91, 92, respectively, and through eye guides 98 fixed to the walls 93. Keeper brackets 99 are also fixed to the walls 93, preferably in vertical alignment with brackets 96, 97 and guides 98, so that a pin 101 inserted therethrough will serve to retain in place the surplus portions of the cord 95 when the hollow body 95 is in its collapsed and deflated configuration.

In order to prevent distortion of the load-bearing walls 93 and consequent depression of the same into the inflated hollow body by such load or similar compressive force, the walls 93 may have incorporated in or adhered to the outer surfaces thereof, at suitably spaced locations therealong, cords or tapes, such as indicated at 94, made of material which is flexible but nonextensible. These cords or tapes are disposed as to be firmly attached to the outwardly directed vertices of the bellows-configured, load-bearing walls 93. By reason of the flexibility of the cords or tapes 94, their securement along the load-bearing walls in the manner described does not interfere with the deflation and collapsing of the bodies 90, by exerting manual force on the outer surface of walls 91, 92.

In FIG. 20, there is shown still another embodiment of the invention, for use particularly as a swimming aid. This embodiment comprises a pair of upper, hollow, self-inflatable bodies 111, 112 and a corresponding pair of lower similar bodies 113, 114. Attached in any convenient fashion to the upper surface of the bodies 113, 114 is an elongated textile fabric, rubber, or plastic sheet 115. The sheet 115 is of a length sufficient to form an elongated loop whose longitudinal axis extends transversely of the bodies 111–114, with the curved ends of the loop disposed outwardly beyond the respective pairs 111, 113 and 112, 114 of the bodies. The hollow bodies 111, 112 are also attached to the sheet 115 in any convenient fashion, along the bottom surfaces of bodies 111, 112. The opposite ends of the sheet 115 may be provided with a buckle 117 and openings 116, or other suitable means for detachably closing the loop. The loop may thus be formed by encircling the sheet 115 around the waist or other part of the body of the swimmer, so that the pairs of expanded and self-inflated bodies 111, 112 and 113, 114 will be disposed adjacent the sides of the back and the sides of the stomach of the swimmer.

The term "float" in the claims hereof is intended to refer to and include swimming aids, life-saving devices and similar devices.

What is claimed is:

1. A float or the like device, comprising a hollow body of relatively stiff but flexible material and composed of a pair of opposed walls extending longitudinally of the body, one of said walls of said body having an air-admitting and escape opening formed therein, the wall of said body opposed to the first-named wall being flexibly joined along opposite longitudinal sides thereof to corresponding opposite sides of said first-named wall, to enable said second-named wall to be movable in opposite directions relative to said first-named wall by flexing said second-named wall toward and away from said first-named wall, said movement of said second-named wall in the direction away from said first-named wall being effective to suck air into said body and inflate the same, said movement of said second-named wall in the direction toward said first-named wall being effective to compress and deflate said body, closure means for said opening whereby to retain the inflated body in its pneumatic condition, and a weight-supporting flexible means connected to one of said walls of the body, said device being adapted to support its own weight and the weight held by said means.

2. A float or like device as defined in claim 1, and having a plurality of hollow bodies as therein defined, said bodies extending in a direction generally parallel to each other, and means for retaining said bodies spaced from one another at a substantially fixed distance when said bodies are in their expanded, inflated configuration, said bodies being connected to one another by said weight-supporting flexible means.

3. A float or like device as defined in claim 1, and having finger-graspable means on the outer surfaces of said body for manually altering the configuration of said body from its said collapsed to its said expanded configuration and vice versa.

4. A float or like device as defined in claim 1, wherein said hollow body is of substantially circular cross-section when the same has been expanded and inflated.

References Cited

UNITED STATES PATENTS

| | | | |
|---|---|---|---|
| 169,781 | 11/1875 | Dayton | 9—314 |
| 1,416,523 | 5/1922 | Strobel | 9—328 |
| 2,355,757 | 8/1944 | Spanel | 9—11 |
| 2,988,848 | 6/1961 | Lemelson | 92—34 X |

MILTON BUCHLER, *Primary Examiner.*

T. MAJOR, *Assistant Examiner.*